United States Patent
Scholz

(12) 
(10) Patent No.: US 6,603,897 B1
(45) Date of Patent: Aug. 5, 2003

(54) OPTICAL MULTIPLEXING DEVICE WITH SEPARATED OPTICAL TRANSMITTING PLATES

(75) Inventor: Robert J. Scholz, Midland (CA)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 10/016,164

(22) Filed: Oct. 22, 2001

(51) Int. Cl.[7] ................................................. G02B 6/28
(52) U.S. Cl. ......................... 385/24; 359/124; 359/127; 359/260
(58) Field of Search ............................. 385/24, 34, 37; 359/124, 127, 130

(56) References Cited

U.S. PATENT DOCUMENTS

| | | | |
|---|---|---|---|
| 4,244,045 A | * | 1/1981 | Nosu ........................... 359/129 |
| 4,904,043 A | | 2/1990 | Schweizer |
| 5,583,683 A | | 12/1996 | Scobey |
| 5,889,904 A | | 3/1999 | Pan et al. |
| 5,946,435 A | | 8/1999 | Zheng et al. |
| 6,215,592 B1 | | 4/2001 | Pelekhaty |
| 6,418,250 B1 | * | 7/2002 | Corbosiero .................. 385/24 |

* cited by examiner

Primary Examiner—Cassandra Spyrou
Assistant Examiner—Leo Boutsikaris
(74) Attorney, Agent, or Firm—William C. Schubert; Glenn H. Lenzen, Jr.

(57) ABSTRACT

A multiplexing device includes two facing-but-spaced apart optical transmitting plates, with optical reflective filters in facing contact with outer surfaces of the optical transmitting plates to define a reflective beam path therebetween. Light transceivers are associated with each of the optical reflective filters. The optical transmitting plates have greater indices of refraction than the central medium between them, so that the beam path has a low angle of incidence to the optical reflective filters but a higher angle in the central medium.

23 Claims, 2 Drawing Sheets

OPTICAL MULTIPLEXING DEVICE WITH SEPARATED OPTICAL TRANSMITTING PLATES

This invention relates to optical devices and, more particularly, to an optical multiplexing device that combines or separates light of different wavelengths.

BACKGROUND OF THE INVENTION

An optical multiplexing device combines light of different wavelengths into a single light beam, or separates the light of different wavelengths from a single light beam. In one approach, the optical multiplexing device includes a series of thin-film bandpass optical filters that reflect the light beam on a beam path between the thin-film bandpass optical filters. Each thin-film bandpass optical filter passes light of a narrow wavelength range, and reflects light of other wavelengths. The light component (also termed "light channel") having a wavelength in the bandpass range may be added to the light beam or separated from the light beam using the thin-film bandpass optical filter of the corresponding bandpass range. The optical multiplexing device of this type is used in wavelength division multiplexing of light signals in optical communications systems.

In those cases where the optical multiplexing device includes a large number of thin-film bandpass optical filters, it is important that the attenuation of the light beam at each of the thin-film bandpass optical filters be as low as possible. One component of the attenuation is the insertion loss as the light beam enters the thin-film bandpass filter. The greater the angle of incidence (as measured from vertical incidence) of the light beam upon the thin-film bandpass filter, the greater is the insertion loss.

It is therefore desirable that the light beam have a low angle of incidence (i.e., nearly vertical incidence) upon the thin-film bandpass optical filter in order to have a low insertion loss. On the other hand, if the angle of incidence is too low, the thin-film bandpass optical filters and their associated light transceivers become too closely crowded together for mechanical compatibility. Some configurations of the optical multiplexing devices have limited the number of thin-film bandpass optical filters that are assembled together in the one device and have adopted special configurations to allow the components to be crowded together, but the result is that the overall size and weight of the optical multiplexing device structure for a large number of light channels are excessively large.

There is a need for an approach for an optical multiplexing device which achieves a low angle of incidence of the light beam onto the thin-film bandpass optical filters, while at the same time allowing a sufficient lateral physical separation between the optical components for mechanical compatibility. The present invention fulfills this need, and further provides related advantages.

SUMMARY OF THE INVENTION

The present invention provides an optical multiplexing device capable of performing multiplexing and/or demultiplexing functions. The optical multiplexing device has a reduced angle of incidence of the optical beam onto the optical reflective filters, as compared with other optical multiplexing devices, while maintaining the lateral physical spacing required for mechanical compatibility of the optical components. The reduced angle of incidence leads to a reduced insertion loss and reduced light beam attenuation. The optical multiplexing device additionally may be provided with a temperature-compensating structure that reduces the effects of changes in temperature upon the optical performance.

In accordance with the invention, a multiplexing device operable over a multiplexing wavelength band of light comprises a first optical transmitting plate having a first-plate outer surface and a first-plate inner surface. The first optical transmitting plate is transparent to light within the multiplexing wavelength band. A first-plate optical reflective filter structure is in facing contact with the first-plate outer surface. The multiplexing device further comprises a second optical transmitting plate having a second-plate outer surface and a second plate inner surface. The second-plate inner surface is in a facing-but-spaced-apart relation to the first-plate inner surface with a central medium such as air or vacuum separating the first optical transmitting plate from the second optical transmitting plate. The second optical transmitting plate is transparent to light within the multiplexing wavelength band. A second-plate optical reflective filter structure is in facing contact with the second-plate outer surface. The first-plate optical reflective filter structure and the second-plate optical reflective filter structure are positioned to define a beam path that is alternatively and sequentially reflected from the first-plate optical reflective filter structure and the second-plate optical reflective filter structure. The first optical transmitting plate and the second optical transmitting plate desirably each have an index of refraction to light within the multiplexing wavelength band that is greater than an index of refraction of the central medium to light within the multiplexing wavelength band.

There is typically at least one light transceiver associated with each of the optical reflective filter structures. The light transceiver is a light source in the case where the multiplexing device is a multiplexer, and a light detector in the case where the multiplexing device is a demultiplexer. Preferably, the first-plate optical reflective filter structure and the second-plate optical reflective filter structure each comprises a thin-film optical reflective filter, such as a low-pass or high-pass edge filter, or a central bandpass filter.

In a practical embodiment of the multiplexing device, there is a spacer affixed to, extending between, and separating the first optical transmitting plate and the second optical transmitting plate. A material of construction of the spacer is selected responsive to a temperature coefficient of change of an index of refraction of the first optical transmitting plate, a temperature coefficient of change of an index of refraction of the second optical transmitting plate, a coefficient of thermal expansion of the first optical transmitting plate, and a coefficient of thermal expansion of the second optical transmitting plate. The spacer may therefore be tailored to maintain the appropriate geometry of the multiplexing device as dimensions change with temperature.

The multiplexing device with spaced-apart optical transmitting plates allows the use of various optional features. A rotationally tunable blocking filter may be positioned in the beam path at a location between the first optical transmitting plate and the second optical transmitting plate. A masking aperture may be disposed on one of the first-plate inner surface and the second-plate inner surface and about the beam path. These optional features improve the optical performance of the multiplexing device, by eliminating light of undesired wavelengths and stray light.

In the present approach, the light path through the central medium may have a relatively large angle with respect to the normal (i.e., perpendicular line) to the optical reflective filter structures. This relatively large angle and the spacing between the two optical transmitting plates allow the optical components to be spaced sufficiently far apart laterally to be mechanically compatible. When the light beam enters the higher-index-of-refraction optical transmitting plates, it is refracted to be closer to the normal direction, and consequently to be incident upon the optical reflective filter structure at a more nearly perpendicular incidence. The result is a lower insertion loss than would be the case for a higher angle of incidence upon the optical reflective filter structure. The reduction of the incident angle upon any coating present on the filter also reduces the coating response rate of change of wavelength transmitted versus angle of incidence, thereby allowing greater filter parameter tolerances.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
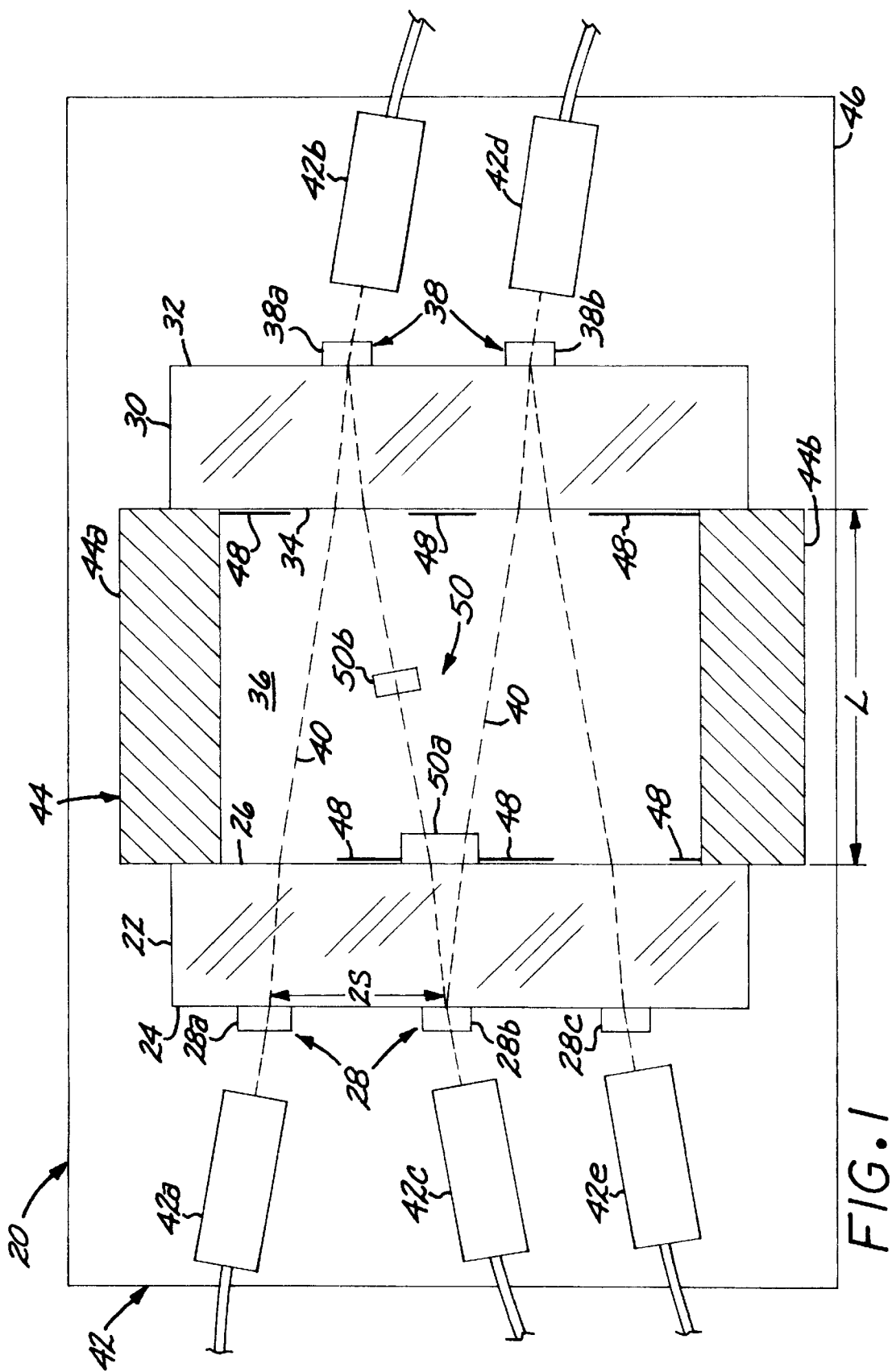
FIG. 1 is a schematic plan view of a multiplexing device.

FIG. 1 depicts a multiplexing device 20 that is operable over a multiplexing wavelength band of light. As used herein, a "multiplexing device" may serve as either a multiplexer that combines wavelength components into a single light beam, or a demultiplexer that separates out the wavelength components of a single light beam. These functions are inverse in nature, except that light sources and light detectors are used as appropriate. Light sources and light detectors are therefore collectively termed "light transceivers".

The multiplexing device 20 includes a first optical transmitting plate 22 having a first-plate outer surface 24 and a first-plate inner surface 26. The first optical transmitting plate 22 is transparent to light within the multiplexing wavelength band.

A first-plate optical reflective filter structure 28 is in facing contact with the first-plate outer surface 24. The first-plate optical reflective filter structure 28 preferably includes at least two first-plate optical reflective filters, and in this case three first-plate optical reflective filters 28a, 28b, and 28c (although more than three first-plate optical reflective filters are normally used). The first-plate optical reflective filter structure 28 and its individual first-plate optical reflective filters 28a, 28b, and 28c may be provided as a single continuous length of filter material affixed to the first-plate outer surface 24, or as discrete segments of filter material affixed to the first-plate outer surface 24, as illustrated. The latter approach has the advantage that the individual first-plate optical reflective filters 28a, 28b, 28c, etc. need not be of the same type.

The first-plate optical reflective filter structure 28 and the first-plate optical reflective filters 28a, 28b, and 28c are preferably thin-film optical reflective filters. Such thin-film optical reflective filters may be edge filters that have a high pass or a low pass wavelength range of light, or they may be central bandpass filters that pass a central wavelength range of light. In each case, light outside the pass wavelength range is reflected. Such filters are known in the art, and are described, for example, in U.S. Pat. Nos. 4,244,045, 5,583, 683, and 6,215,592, whose disclosures are incorporated by reference.

The multiplexing device 20 further includes a second optical transmitting plate 30 having a second-plate outer surface 32 and a second-plate inner surface 34. The second optical transmitting plate 30 is transparent to light within the multiplexing wavelength band. The second-plate inner surface 34 is in a facing-but-spaced-apart and parallel relation to the first-plate inner surface 26. A central medium 36, which is preferably vacuum or air or other gas, lies between the first optical transmitting plate 22 and the second optical transmitting plate 30.

A second-plate optical reflective filter structure 38 is in facing contact with the second-plate outer surface 32. The second-plate optical reflective filter structure 38 preferably includes at least one second-plate optical reflective filter, and in this case has two second-plate optical reflective filters 38a and 38b (although more than two second-plate optical reflective filters are normally used). The second-plate optical reflective filter structure 38 and its individual second-plate optical reflective filters 38a and 38b may be provided as a single continuous length of filter material affixed to the second-plate outer surface 32, or as discrete segments of filter material affixed to the second-plate outer surface 32, as illustrated. The latter approach has the advantage that the individual second-plate optical reflective filters 38a, 38b, 38c, etc. need not be of the same type. The second-plate optical reflective filter structure 38 and the second-plate optical reflective filters 38a and 38b are preferably thin-film optical reflective filters of generally the same type as discussed above, and the prior discussion is incorporated here.

The first-plate thin-film optical reflective filter structure 28 and its first-plate thin-film optical reflective filters 28a, 28b, and 28c, and the second-plate thin-film optical reflective filter structure 38 and its second-plate thin-film optical reflective filters 38a and 38b are positioned to define a beam path 40 that is alternatively and sequentially reflected from one of the first-plate thin-film optical reflective filters to one of the second-plate thin-film optical reflective filters, and so on. Such arrangements are known in the art for other forms of multiplexer devices, see for example the '045 patent.

Figure 2:
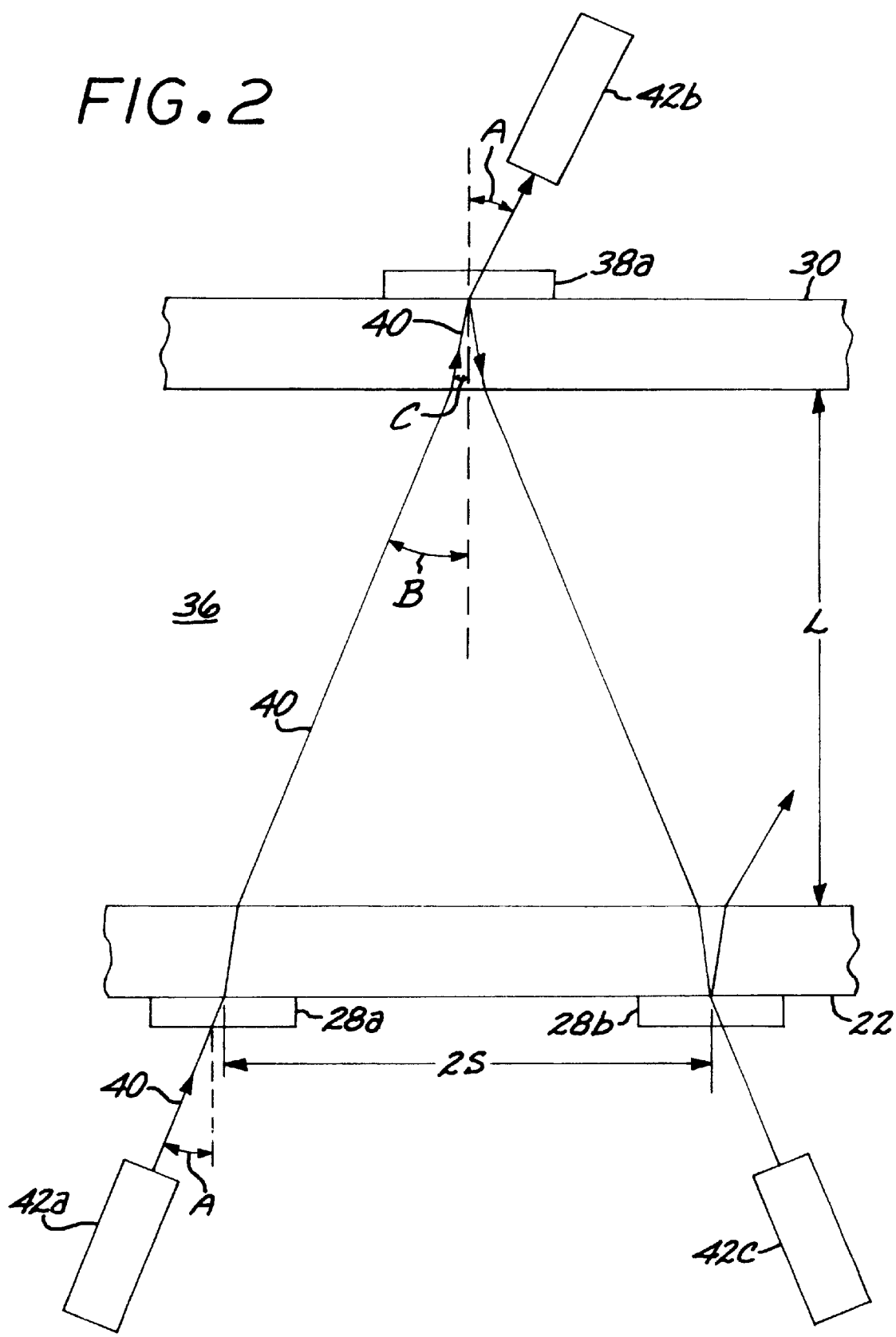
FIG. 2 is a detail of FIG. 1, showing the angular relations between the optical components and the beam path.

A light transceiver 42 is associated with each of the thin-film optical reflective filters 28a, 28b, 28c, 38a, and 38b. The selection of the light transceivers 42 depends upon whether the multiplexing device 20 is a multiplexer or a demultiplexer. In the illustrations of FIGS. 1 and 2, the multiplexing device 20 is a demultiplexer. The light transceiver 42a is therefore a light source, and the light transceivers 42b, 42c, 42d, and 42e are light detectors. Light propagates along the beam path 40 from the light transceiver 42a. In the particular illustrated approach, the light-source light transceiver 42a and the light-detector light transceivers 42b, 42c, 42d, and 42e are collimators with associated optical fibers. Light from a remote source (not shown) is provided to the light-source light transceiver 42a by an optical fiber and directed by the collimator along the beam path 40. Light collected by the collimator of each light-detector light transceiver 42b, 42c, 42e, and 42d is delivered via the respective optical fibers to respective remote detectors (not shown). The use of the collimator/optical fiber architecture allows the structure of the multiplexing device 20 to be compact and light in weight, and the filters interact with a near-collimated beam of light to achieve narrow bandpass.

In the case where the multiplexing device is a multiplexer, the light transceiver 42a would be light detector, the light transceivers 42b, 42c, 42d, and 42e would be light sources, and the light would propagate toward the light transceiver 42a along the beam path 40. Otherwise, the structure would be like that illustrated.

In the illustrated embodiment, a spacer 44 is affixed to, extends between, and separates the first optical transmitting plate 22 and the second optical transmitting plate 30. The ends of the spacer 44 are desirably polished flat and parallel to preserve the parallelism of the respective faces 26 and 34 of the first optical transmitting plate 22 and the second optical transmitting plate 30. The spacer 44 may take the form of two spacer elements 44a and 44b, made of the same material, that hold the first optical transmitting plate 22 and the second optical transmitting plate 30 in their parallel, spaced-apart relation. However, the spacer 44 need not be two parts. A single-piece spacer 44 with a central aperture may be used.

In a particularly preferred form of this embodiment, the spacer 44 aids in maintaining the stability of the optical structure during temperature changes. As the temperature changes, the index of refraction and the physical dimensions of the first optical transmitting plate 22 and the second optical transmitting plate 30 change. These changes in index of refraction and physical dimensions result in misalignments, particularly when there are many optical reflective filters, there are many reflections of the light beam along the beam path 40, and the physical size of the first optical transmitting plate 22 and the second optical transmitting plate 30 become large. This lateral movement (i.e., parallel to the plane of the faces 24 and 32) of the point of incidence of the beam path 40 on each respective optical reflective filter structure 28 and 38 is termed "beam walk-off". To partially offset these changes and the beam walk-off, a material of construction of the spacer 44 may be selected responsive to a coefficient of thermal expansion of the first optical transmitting plate 22, the second optical transmitting plate 30, and other structural properties of the system.

Under beam walk-off conditions, as the temperature changes the location of the area of illumination on each of the clear apertures of the respective optical reflective filter structures 28 and 38 also changes. The extent of beam walk-off at each of the optical reflective filter structures 28 and 38 is dependent upon the length L of the spacer 44 and the lateral spacing 2S between each of the optical reflective filter structures, assuming the optical transmitting plates 22 and 30 are each thin compared to these spacings L and 2S. The beam walk-off adversely affects the performance of the system. In a preferred approach, the spacer 44 is made of a material with a linear coefficient of thermal expansion $\alpha$. The optical transmitting plates 22 and 30 are each made of the same optical quality material (typically different than the material of construction of the spacer 44) with a linear coefficient of thermal expansion $\beta$. Assuming that the optical transmitting plates 22 and 30 remain parallel, to a first order the optimum expansion ratio at the optical reflective filter 38a is $\alpha/\beta=L^2/S^2$, the optimum expansion ratio at the optical reflective filter 28b is $\alpha/\beta=L^2/4S^2$, the optimum expansion ratio at the optical reflective filter 38b is $\alpha/\beta=L^2/9S^2$, and so on for succeeding optical reflective filters. (L and S are indicative of the geometry of the multiplexing device 20.) The net result is that the total number of transceiver channels is limited due to bandpass deteriorations after many reflections resulting from a combination of beam walk-off and single-mode Gaussian beam coupling efficiency changes between the transceivers located at different distances along the beam path 40. In practice, the design is optimized for one of the downstream optical reflective filter structures, with preceding and following optical reflective filter structures and their input or output channels experiencing a small performance degradation in respect to beam walkoff.

The multiplexing device 20 further includes a support, in the form of a mounting plate 46 in the illustrated embodiment, upon which the other components 22–44 are supported. In one construction, the midpoints of the spacer elements 44a and 44b are affixed to the mounting plate 46, the optical transmitting plates 22 and 30 are affixed to the spacer elements 44a and 44b, the optically reflective filter structures 28 and 38 are mounted to the respective optical transmitting plates 22 and 30, and the light transceivers 42 are also mounted to the respective optical transmitting plates 22 and 30. However, the light transceivers 42 may be mounted to either the respective optical transmitting plates 22 or 30, or to the mounting plate 46, whichever gives the better combination of stability and manufacturability.

The separation between the optical transmitting plates 22 and 30 provides a volume (filled with the central medium 36) in which optional structure may be positioned and mounted, and two types of such optional structure are illustrated in FIG. 1. A masking aperture 48 may be disposed on one of the first-plate inner surface 26 and the second-plate inner surface 34, and about the beam path 40. Several such masking apertures 48 are shown in FIG. 1. The masking aperture 48 prevents stray, angularly divergent light from reaching the filter structures and thence the light transceivers.

The second type of illustrated optional structure is a rotational blocking filter 50 positioned in the beam path 40 at a location between the first optical transmitting plate 22 and the second optical transmitting plate 30. The blocking filter may be affixed to one of the optical transmitting plates 22 and 30, or to the mounting plate 46. In FIG. 1, a first blocking filter 50a is affixed to the first-plate inner surface 26 of the first optical transmitting plate 22, and a second blocking filter 50b is affixed to the mounting plate 46 at a location separated from either of the optical transmitting plates 22 and 30. The function of the blocking filters 50 is to remove light of undesired wavelengths from the light beam as it propagates along the beam path 40. The filter structures 28 and 38 are designed to pass certain wavelengths and reflect other wavelengths, but they are not always perfect in performing these functions. The blocking filters remove any stray wavelengths that should not be present in the light beam at a particular location along the beam path 40. As such, they serve as tuning filters that may be inserted into the multiplexing device 20 as needed, to manage bandpass or power density variations due to the device or the source of light.

FIG. 2 depicts the beam path 40 and its angular relationships with the structure of a portion of the multiplexing device 20 in greater detail, with the angular relationships exaggerated for illustrative purposes. Preferably, the first optical transmitting plate 22 and the second optical transmitting plate 30 each have an index of refraction to light within the multiplexing wavelength band that is greater than an index of refraction of the central medium 36 to light within the multiplexing wavelength band. This result is that the angle B at which the light beam 40 is incident upon the second optically transmitting plate 30 is greater than the angle C at which the light beam 40 is incident upon the optical reflective filter 38a. Angle A is equal to angle B if the central medium 36 is the same as the medium containing the light transceivers 42. It is desired that the angle C be small, to reduce insertion losses into the optical reflective filter 38a. However, in the absence of the second optical transmitting plate 30, the separation distance 2S between the optical reflective filters 28a and 28c would be about 2L tan C, where L is the spacing between the optical transmitting plates 22 and 30. With the second optical transmitting plate 30 present, the distance 2S between the optical reflective filters 28a and 28c is about 2L tan B, a significantly larger value. (The geometric relationships are not meant to be exact and are presented only for illustrative purposes. However, in the usual case where the thicknesses of the optically transmitting plates 22 and 30 are much smaller than their separation L, the relationships are reasonably good approximations.) The distance 2S is sometimes the limiting factor in constructing a multiplexing device 20, because it determines how tightly the optical components 28a, 28b, 42a, and 42c are packed together and thence their mechanical compatibility. The present approach of spaced-apart optical transmitting plates 22 and 30 allows this separation distance 2S to be increased by increasing both L and angle B, while at the same time keeping angle C small to achieve small insertion losses.

Most preferably, the index of refraction of the substrate of the optical reflective filters 28a, 28b, and 38a is intermediate between that of the optical transmitting plates 22 and 30, on the one hand, and the central medium 36, on the other hand. This relation allows the angle of incidence of the light beam 40 into the multiplexing device 20 to be as large as consistent with the operation of the multiplexing device 20, while maintaining angle C small and the separation distance 2S relatively large.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A multiplexing device operable over a multiplexing wavelength band of light, the multiplexing device comprising
    a first optical transmitting plate having a first-plate outer surface and a first-plate inner surface, the first optical transmitting plate being transparent to light within the multiplexing wavelength band;
    a first-plate optical reflective filter structure in facing contact with the first-plate outer surface;
    a second optical transmitting plate having a second-plate outer surface and a second plate inner surface, the second-plate inner surface being in a facing-but-spaced-apart relation to the first-plate inner surface with a central medium separating the first optical transmitting plate from the second optical transmitting plate, the second optical transmitting plate being transparent to light within the multiplexing wavelength band, wherein the first optical transmitting plate and the second optical transmitting plate each have an index of refraction to light within the multiplexing wavelength band that is multiplexing wavelength band; and
    a second-plate optical reflective filter structure in facing contact with the second-plate outer surface,
    the first-plate optical reflective filter structure and the second-plate optical reflective filter structure being positioned to define a beam path that is alternatively and sequentially reflected from the first-plate optical reflective filter structure and the second-plate optical reflective filter structure.

2. The multiplexing device of claim 1, further including
    at least one light transceiver associated with each of the optical reflective filter structures.

3. The multiplexing device of claim 1, wherein the first-plate optical reflective filter structure and the second-plate optical reflective filter structure each comprises a thin-film optical reflective filter.

4. The multiplexing device of claim 1, further including
    a support to which the first optical transmitting plate and the second optical transmitting plate are affixed.

5. The multiplexing device of claim 1, further including
    a spacer affixed to, extending between, and separating the first optical transmitting plate and the second optical transmitting plate.

6. The multiplexing device of claim 5, wherein a material of construction of the spacer is selected responsive to a coefficient of thermal expansion of the optical transmitting plates and a geometry of the multiplexing device.

7. The multiplexing device of claim 1, further including
    a blocking filter positioned in the beam path at a location between the first optical transmitting plate and the second optical transmitting plate.

8. The multiplexing device of claim 1, further including
    a masking aperture disposed on one of the first-plate inner surface and the second-plate inner surface and about the beam path.

9. The multiplexing device of claim 1, wherein the central medium is selected from the group consisting of air and vacuum.

10. A multiplexing device operable over a multiplexing wavelength band of light, the multiplexing device comprising
    a first optical transmitting plate having a first-plate outer surface and a first-plate inner surface, the first optical transmitting plate being transparent to light within the multiplexing wavelength band;
    a first-plate optical reflective filter structure in facing contact with the first-plate outer surface;
    a second optical transmitting plate having a second-plate outer surface and a second plate inner surface, the second-plate inner surface being in a facing-but-spaced-apart relation to the first-plate inner surface with a central medium separating the first optical transmitting plate from the second optical transmitting plate, the second optical transmitting plate being transparent to light within the multiplexing wavelength band;
    a second-plate optical reflective filter structure in facing contact with the second-plate outer surface,
    the first-plate optical reflective filter structure and the second-plate optical reflective filter structure being positioned to define a beam path that is alternatively and sequentially reflected from the first-plate optical reflective filter structure and the second-plate optical reflective filter structure; and
    a spacer affixed to, extending between, and separating the first optical transmitting plate and the second optical transmitting plate.

11. The multiplexing device of claim 10, wherein a material of construction of the spacer is selected responsive to a coefficient of thermal expansion of the optical transmitting plates and a geometry of the multiplexing device.

12. The multiplexing device of claim 10, wherein the first optical transmitting plate and the second optical transmitting plate each have an index of refraction to light within the multiplexing wavelength band that is greater than an index of refraction of the central medium to light within the multiplexing wavelength band.

13. A multiplexing device operable over a multiplexing wavelength band of light, the multiplexing device comprising
   a first optical transmitting plate having a first-plate outer surface and a first-plate inner surface, the first optical transmitting plate being transparent to light within the multiplexing wavelength band;
   a first-plate optical reflective filter structure in facing contact with the first-plate outer surface;
   a second optical transmitting plate having a second-plate outer surface and a second plate inner surface, the second-plate inner surface being in a facing-but-spaced-apart relation to the first-plate inner surface with a central medium separating the first optical transmitting plate from the second optical transmitting plate, the second optical transmitting plate being transparent to light within the multiplexing wavelength band;
   a second-plate optical reflective filter structure in facing contact with the second-plate outer surface,
   the first-plate optical reflective filter structure and the second-plate optical reflective filter structure being positioned to define a beam path that is alternatively and sequentially reflected from the first-plate optical reflective filter structure and the second-plate optical reflective filter structure; and
   a blocking filter positioned in the beam path at a location between the first optical transmitting plate and the second transmitting plate.

14. The multiplexing device of claim 13, wherein the first optical transmitting plate and the second optical transmitting plate each have an index of refraction to light within the multiplexing wavelength band that is greater than an index of refraction of the central medium to light within the multiplexing wavelength band.

15. A multiplexing device operable over a multiplexing wavelength band of light, the multiplexing device comprising
   a first optical transmitting plate having a first-plate outer surface and a first-plate inner surface, the first optical transmitting plate being transparent to light within the multiplexing wavelength band;
   a first-plate optical reflective filter structure in facing contact with the first-plate outer surface;
   a second optical transmitting plate having a second-plate outer surface and a second plate inner surface, the second-plate inner surface being in a facing-but-spaced-apart relation to the first-plate inner surface with a central medium separating the first optical transmitting plate from the second optical transmitting plate, the second optical transmitting plate being transparent to light within the multiplexing wavelength band;
   a second-plate optical reflective filter structure in facing contact with the second-plate outer surface,
   the first-plate optical reflective filter structure and the second-plate optical reflective filter structure being positioned to define a beam path that is alternatively and sequentially reflected from the first-plate optical reflective filter structure and the second-plate optical reflective filter structure; and
   a masking aperture disposed on one of the first-plate inner surface and the second-plate inner surface and about the beam path.

16. The multiplexing device of claim 15, wherein the first optical transmitting plate and the second optical transmitting plate each have an index of refraction to light within the multiplexing wavelength band that is greater than an index of refraction of the central medium to light within the multiplexing wavelength band.

17. A multiplexing device operable over a multiplexing wavelength band of light, the multiplexing device comprising
   a first optical transmitting plate having a first-plate outer surface and a first-plate inner surface, the first optical transmitting plate being transparent to light within the multiplexing wavelength band;
   a first-plate optical reflective filter structure in facing contact with the first-plate outer surface;
   a second optical transmitting plate having a second-plate outer surface and a second plate inner surface, the second-plate inner surface being in a facing-but-spaced-apart relation to the first-plate inner surface with a central medium separating the first optical transmitting plate from the second optical transmitting plate, the second optical transmitting plate being transparent to light within the multiplexing wavelength band, wherein the central medium in selected from the group consisting of air and vacuum; and
   a second-plate optical reflective filter structure in facing contact with the second-plate outer surface,
   the first-plate optical reflective filter structure and the second-plate optical reflective filter structure being positioned to define a beam path that is alternatively and sequentially reflected from the first-plate optical reflective filter structure and the second-plate optical reflective filter structure.

18. A multiplexing device operable over a multiplexing wavelength band of light, the multiplexing device comprising
   a first optical transmitting plate having a first-plate outer surface and a first-plate inner surface, the first optical transmitting plate being transparent to light within the multiplexing wavelength band;
   a first-plate optical reflective filter structure in facing contact with the first-plate outer surface, the first-plate optical reflective filter structure comprising at least two first-plate thin-film optical reflective filters;
   a second optical transmitting plate having a second-plate outer surface and a second plate inner surface, the second-plate inner surface being in a facing but spaced apart relation to the first-plate inner surface with a central medium separating the first optical transmitting plate from the second optical transmitting plate, the second optical transmitting plate being transparent to light within the multiplexing wavelength band; and
   a second-plate optical reflective filter structure in facing contact with the second-plate outer surface, the second-plate optical reflective filter structure comprising at least one second-plate thin-film optical reflective filter;
   a light transceiver associated with each of the thin-film optical reflective filters,
   wherein the first-plate thin-film optical reflective filters and the second-plate thin-film optical reflective filters are positioned to define a beam path that is alternatively and sequentially reflected from one of the first-plate thin-film optical reflective filters and one of the second-plate thin-film optical reflective filters, and wherein the first optical transmitting plate and the second optical transmitting plate each have an index of refraction to light within the multiplexing wavelength band that is greater than an index of refraction of the central medium to light within the multiplexing wavelength band.

19. The multiplexing device of claim 18, further including a spacer affixed to, extending between, and separating the first optical transmitting plate and the second optical transmitting plate.

20. The multiplexing device of claim 19, wherein a material of construction of the spacer is selected responsive to a coefficient of thermal expansion of the optical transmitting plates and a geometry of the multiplexing device.

21. The multiplexing device of claim 18, further including a blocking filter positioned in the beam path at a location between the first optical transmitting plate and the second optical transmitting plate.

22. The multiplexing device of claim 18, further including a masking aperture disposed on one of the first-plate inner surface and the second-plate inner surface and about the beam path.

23. The multiplexing device of claim 18, further including a support to which the first optical transmitting plate and the second optical transmitting plate are affixed.

* * * * *